United States Patent
Ito et al.

(10) Patent No.: US 7,610,159 B2
(45) Date of Patent: Oct. 27, 2009

(54) MULTIVARIABLE MASS FLOW RATE TRANSMITTER SYSTEM AND FLOW RATE SETTING TOOL

(75) Inventors: Akio Ito, Musashino (JP); Masaru Nakagawa, Musashino (JP); Yoshihide Suzuki, Musashino (JP)

(73) Assignee: Yokogawa Electric Corporation, Musashino-Shi, Tokyo (JP)

( * ) Notice: Subject to any disclaimer, the term of this patent is extended or adjusted under 35 U.S.C. 154(b) by 50 days.

(21) Appl. No.: 11/729,029

(22) Filed: Mar. 27, 2007

(65) Prior Publication Data

US 2007/0244654 A1 Oct. 18, 2007

(30) Foreign Application Priority Data

Mar. 28, 2006 (JP) .............................. 2006-088466
Jul. 5, 2006 (JP) .............................. 2006-185046

(51) Int. Cl.
*G01F 1/76* (2006.01)
*G06F 17/40* (2006.01)

(52) U.S. Cl. ........................... 702/50; 702/45; 702/183; 703/9; 73/861.356

(58) Field of Classification Search .................. 702/50, 702/45

See application file for complete search history.

(56) References Cited

U.S. PATENT DOCUMENTS

| 7,424,346 | B2* | 9/2008 | Shajii et al. ................. 700/282 |
| 2002/0198668 | A1* | 12/2002 | Lull et al. ..................... 702/45 |
| 2005/0125190 | A1* | 6/2005 | Koyama et al. ............. 702/127 |

FOREIGN PATENT DOCUMENTS

JP 2005-190461 7/2005

OTHER PUBLICATIONS

Itou, Akio et al., "EJX910 Multivariable Transmitter," Yokogawa Technical Report English Edition, No. 42 (2006).

* cited by examiner

*Primary Examiner*—Hal D Wachsman
(74) *Attorney, Agent, or Firm*—John J. Penny, Jr.

(57) ABSTRACT

A system includes a multivariable mass flow rate transmitter having a mass flow rate computation section, and a flow rate setting tool which performs setup of the mass flow rate computation section, the flow rate setting tool including a parameter generation section, a condition input section, a model computation section, a first mass flow rate display section which displays an output value of the model computation section, a second mass flow rate display section which displays the computation result, and a diagnosing display screen which displays the first and second mass flow rate display sections on the same screen.

13 Claims, 10 Drawing Sheets

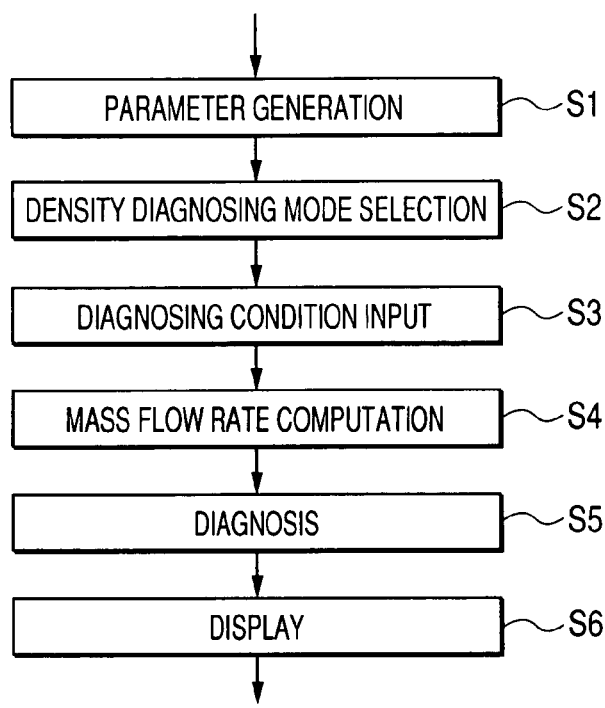
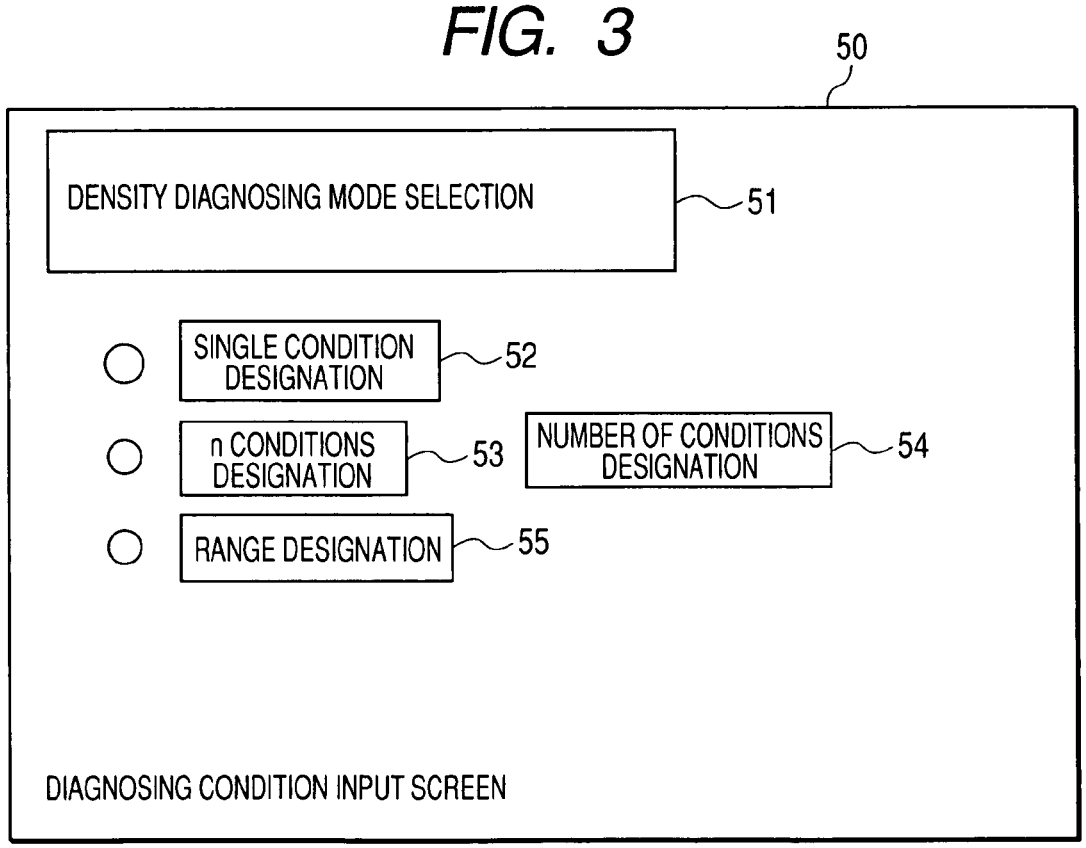

FIG. 5
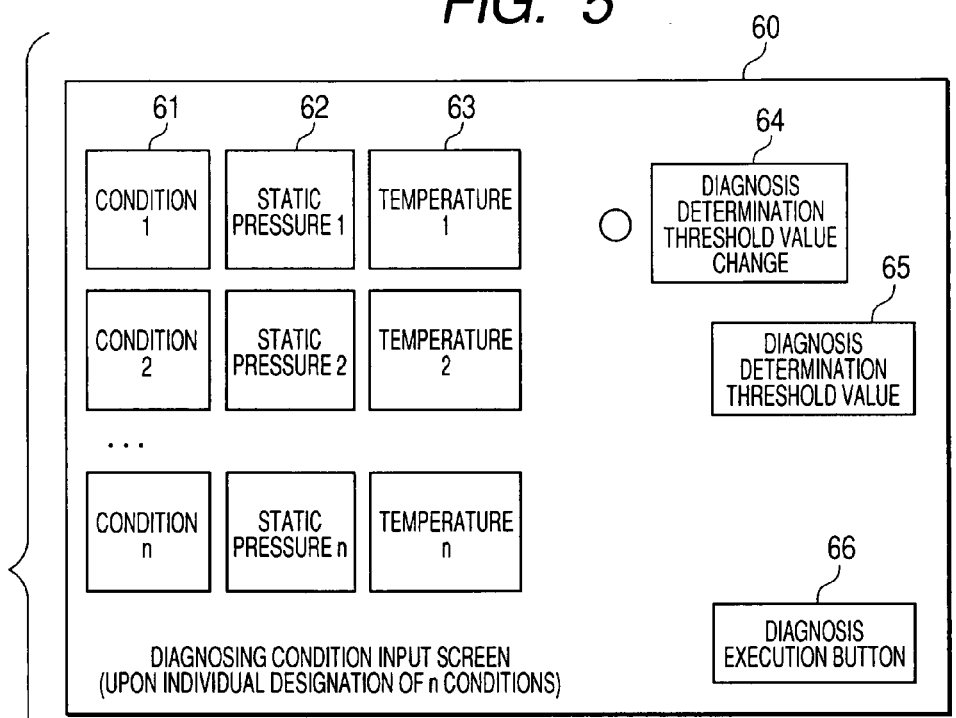
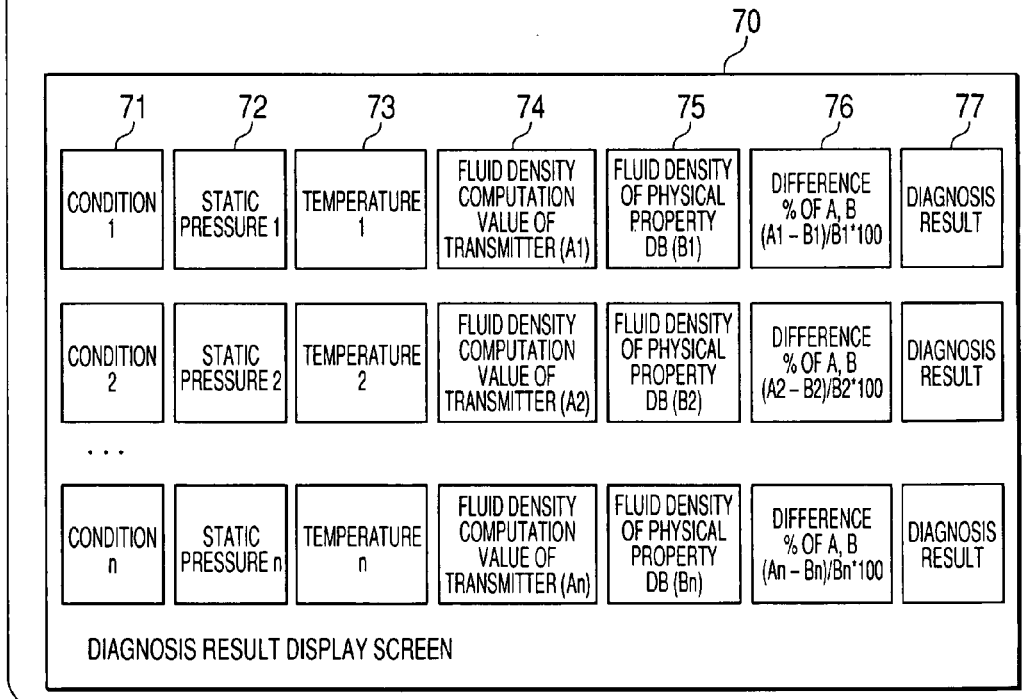

FIG. 6
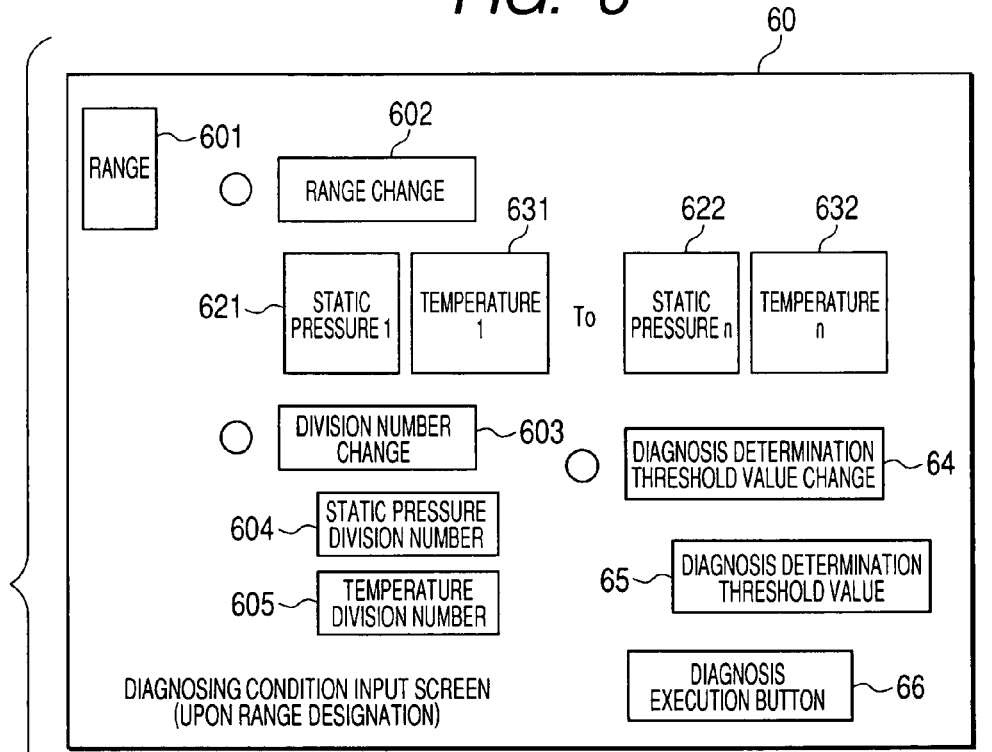
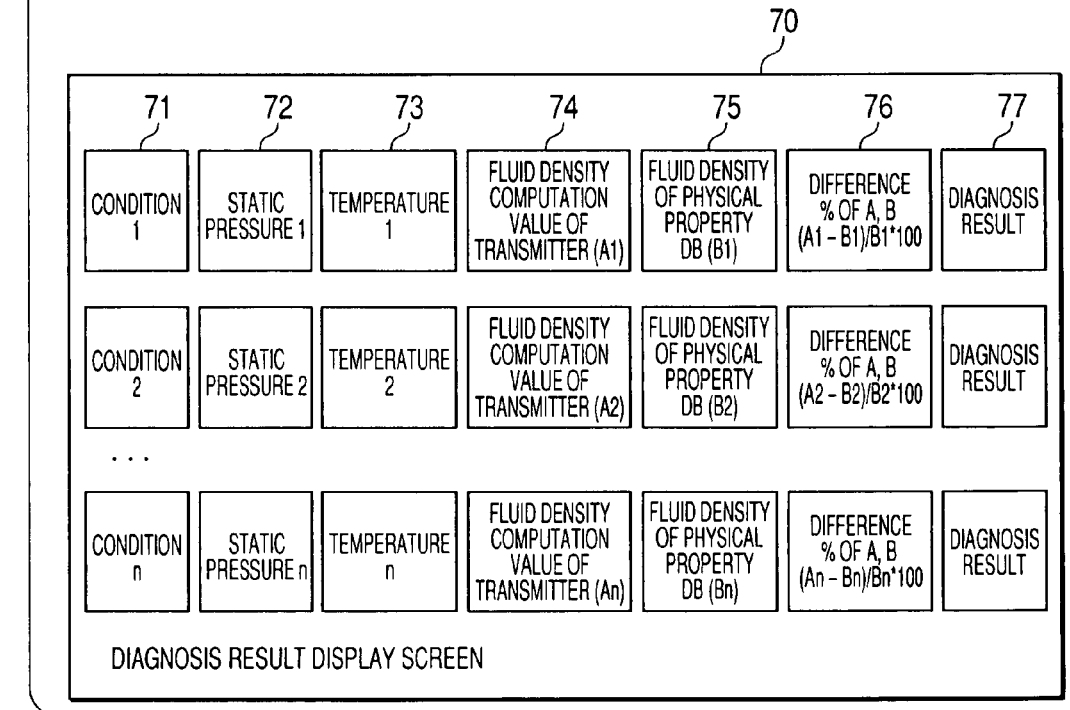

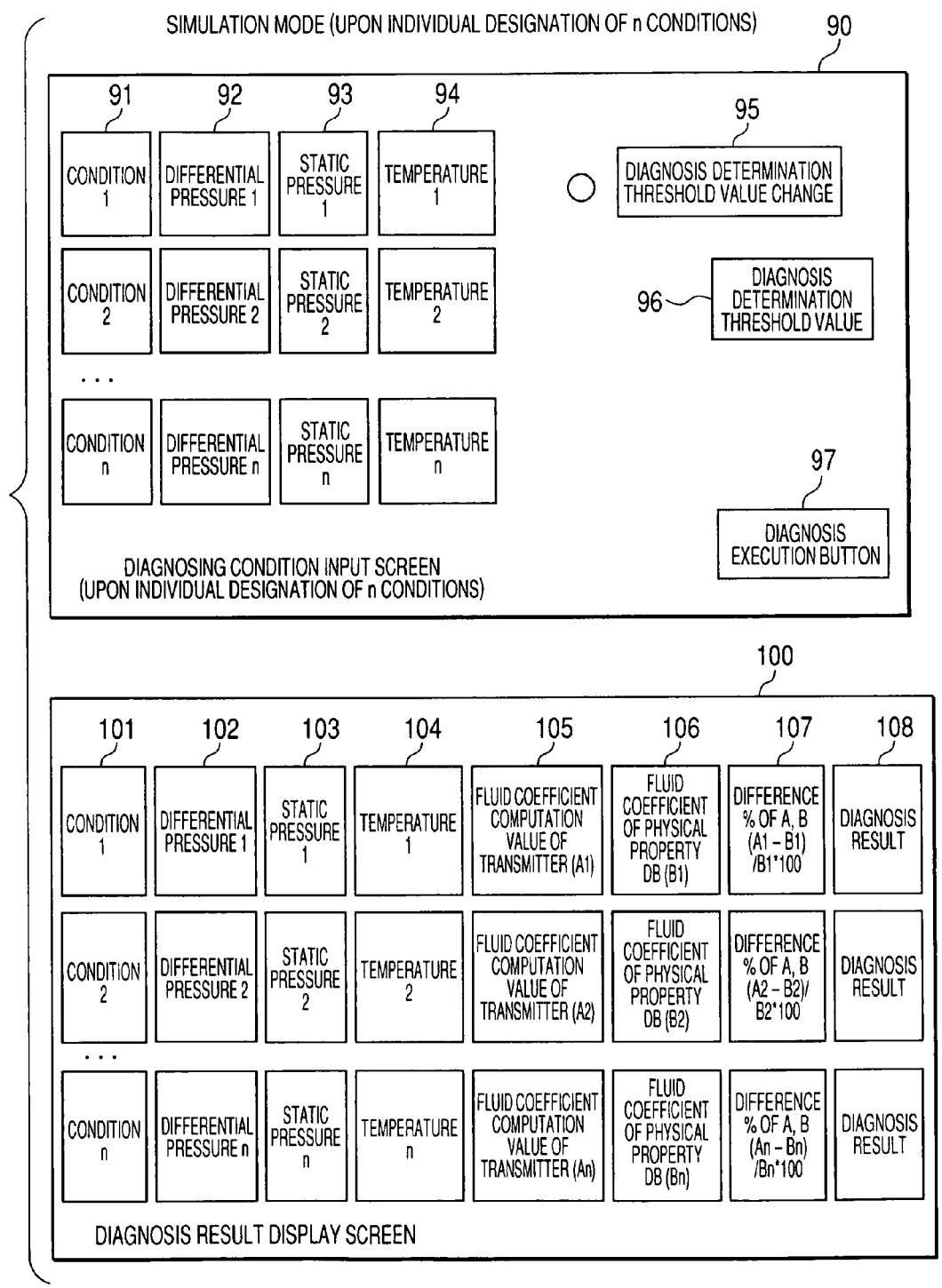

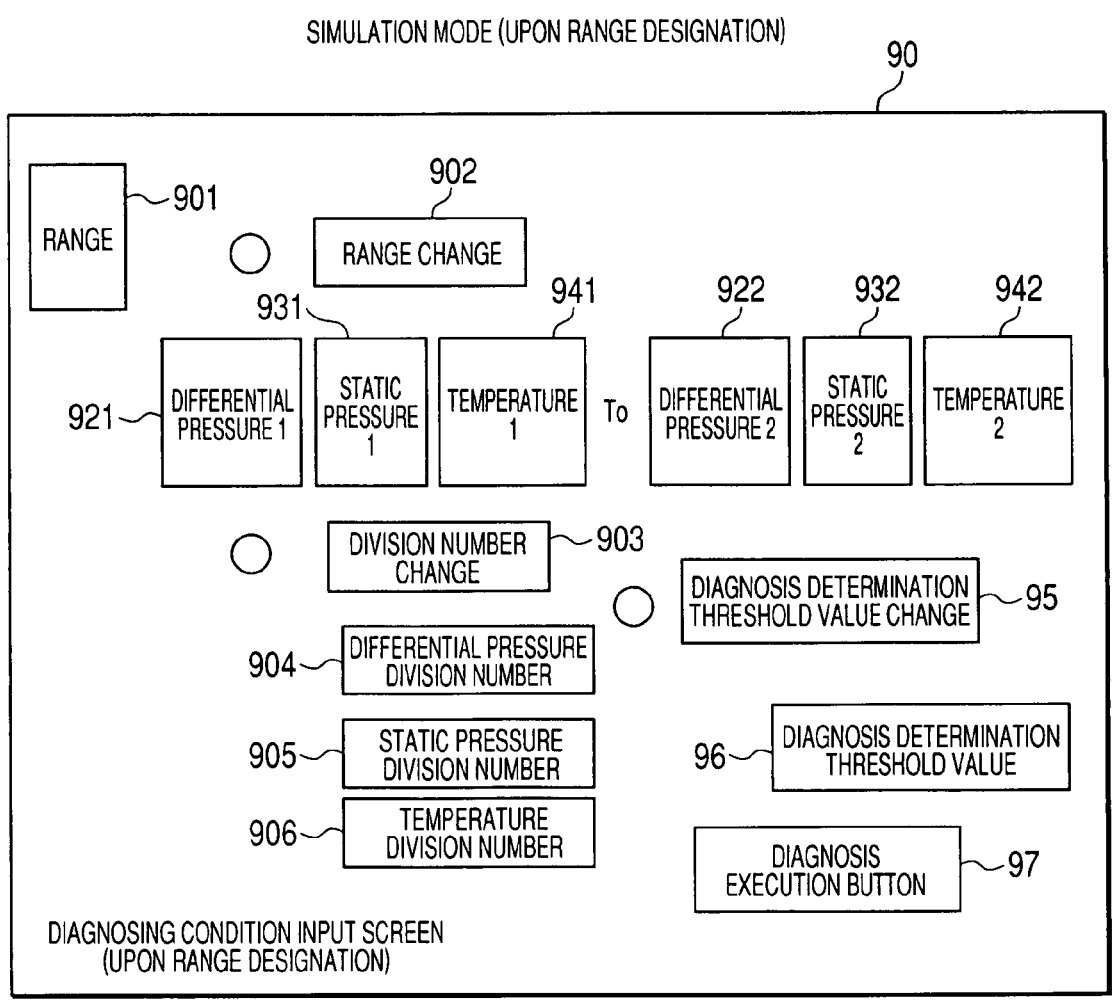

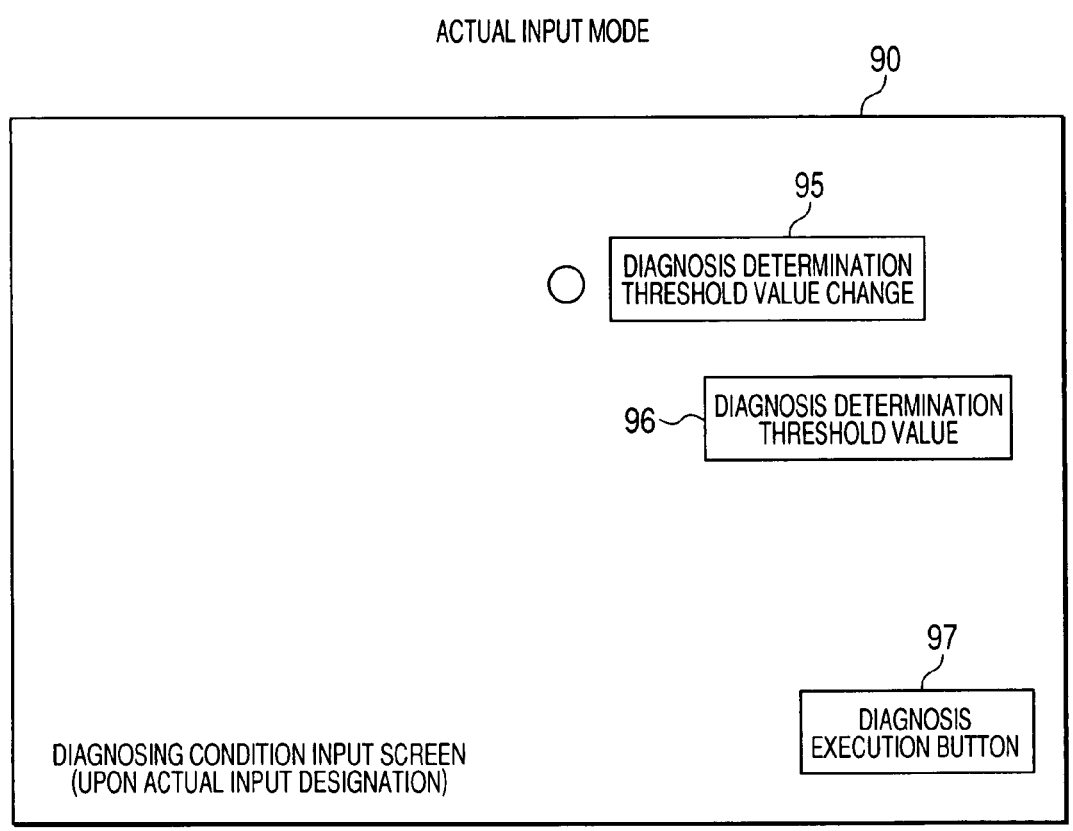

MULTIVARIABLE MASS FLOW RATE TRANSMITTER SYSTEM AND FLOW RATE SETTING TOOL

This application claims foreign priorities based on Japanese Patent application No. 2006-088466, filed Mar. 28, 2006, and Japanese Patent application No. 2006-185046, filed Jul. 5, 2006, the contents of which are incorporated herein by reference in their entireties.

BACKGROUND OF THE INVENTION

1. Field of the Invention

The present invention relates to a multivariable mass flow rate transmitter system provided with a multivariable mass flow rate transmitter (multivariable transmitter), and to a flow rate setting tool used therein.

2. Description of the Related Art

There has been a multivariable mass flow rate transmitter to calculate a mass flow rate from a differential pressure, static pressure and temperature detected by a process, and transmit the calculated mass flow rate to a network (for example, refer to JP-A-2005-190461).

The multivariable mass flow rate transmitter has been demanded to operate in low power consumption, and it should perform high-degree calculations in real time by a restricted calculation performance. Under such situation, a mass flow rate computation section in the multivariable mass flow rate transmitter calculates a mass flow rate by using a simplified equation for fluid density and viscosity.

Specifically, for example, the mass flow rate computation section calculates a mass flow rate by using a simplified equation. Setup of operational parameters for the equation in the mass flow rate computation section is then performed by using an external flow rate setting tool which is externally provided from the multivariable mass flow rate transmitter. Further, a unique calculation method is employed to support, in high speed and high accuracy, a number of flow rate standards for an orifice, a nozzle, a venturi tube, etc., and fluid types such as a general gas, a steam table, a natural gas. Specifically, Reynolds-number correction is performed, the influence caused by adiabatic expansion of gas is corrected, and the density is corrected by using a static pressure and temperature.

As is understood from the above, usability of the flow rate setting tool is very important in order to effectively use of the performance of multivariable mass flow rate transmitter. As for the related multivariable transmitter, refer to "multivariable transmitter EJX910" by Ito, et al., Yokogawa Technical Report, Vol. 50, No. 2 (issued on Apr. 20, 2006), pp. 65-68.

However, there is a problem that the multivariable mass flow rate transmitter cannot calculate an accurate mass flow rate in a case where there are problems in the setup of the flow rate setting tool or in the setup of the transmitter.

For example, in the case where operational parameters are generated in the flow rate setting tool under a diagnosing condition in which a range of the static pressure and temperature is too wide, the accuracy of the mass flow rate calculated by the multivariable mass flow rate transmitter deteriorates.

In the setup of the transmitter, when there is abnormality in a temperature cabling, or when a differential pressure, static pressure and temperature detected by the process exceed the set range, an alarm occurs and the mass flow rate cannot be calculated. In fact, the cause may be not only the problem in the flow rate setting tool, but also the problem in the setup on the transmitter side.

There are also problems such that the operation to generate operational parameters by the flow rate setting tool, download the operational parameters to the multivariable flow rate transmitter, extract a computation result of the flow rate computation section in-the multivariable flow rate transmitter, and diagnose the computation result is complicated and requires time and man-hours. In order to perform an appropriate setup, the operation described above need to be repeated for multiple times.

SUMMARY OF THE INVENTION

The present invention has been made in view of the above circumstances, provides a multivariable mass flow rate transmitter system which is provided with a good usable flow rate setting tool and adapted to set optimal operational parameters easily in a short time, and also provides the flow rate setting tool.

In some implementations, a multivariable mass flow rate transmitter system of the invention, comprising:

a multivariable mass flow rate transmitter which has a mass flow rate computation section and is connected to a network; and a flow rate setting tool which performs a setup of the mass flow rate computation section in the multivariable mass flow rate transmitter via the network, wherein the flow rate setting tool includes:

a parameter generation section which generates operational parameters of the mass flow rate computation section;

a condition input section for inputting a diagnosing condition;

an interface section which transmits the operational parameters to the multivariable mass flow rate transmitter via the network, and receives a computation result of the mass flow rate computation section;

a model computation section which calculates a mass flow rate value based on the diagnosing condition;

a first mass flow rate display section which displays an output value of the model computation section;

a second mass flow rate display section which displays the computation result of the mass flow rate computation section; and a diagnosing display screen which displays the first mass flow rate display section and the second mass flow rate display section on the same screen.

In the multivariable flow rate transmitter system, the model computation section calculates the mass flow rate value based on each of a plurality of diagnosing conditions that are generated automatically in predetermined numbers from the diagnosing condition inputted in the condition input section.

In the multivariable flow rate transmitter system, the diagnosing display screen displays a value based on a difference between the output value of the model computation section and the computation result of the mass flow rate computation section.

In the multivariable flow rate transmitter system, the mass flow rate computation section in the multivariable mass flow rate transmitter comprises:

a simulation mode computation section which employs the operational parameters transmitted from the flow rate setting tool; and an actual input mode computation section which employs actual data of process that are inputted in the multivariable mass flow rate transmitter.

In the multivariable flow rate transmitter system, the second mass flow rate display section includes a simulation mode display section and an actual input mode display section which display at least one of a computation result of the simulation mode computation section and a computation result of the actual input mode computation section, being received from the multivariable mass flow rate transmitter.

In the multivariable flow rate transmitter system, the first mass flow rate display section includes a simulation mode display section and an actual input mode display section which display at least one of the output value of the model computation section in the simulation mode and the output value of the model computation section in the actual input mode.

In the multivariable mass flow rate transmitter system, the model computation section executes a model computation in the actual input mode by obtaining the actual data of the process from the multivariable mass flow rate transmitter.

In some implementations, a flow rate setting tool of the invention for performing a setup of a mass flow rate computation section in a multivariable mass flow rate transmitter via a network, the flow rate setting tool comprising:

a parameter generation section which generates operational parameters of the mass flow rate computation section;

a condition input section for inputting a diagnosing condition;

an interface section which transmits the operational parameters to the multivariable mass flow rate transmitter via the network, and receives a computation result of the mass flow rate computation section;

a model computation section which calculates a mass flow rate value based on the diagnosing condition;

a first mass flow rate display section which displays an output value of the model computation section;

a second mass flow rate display section which displays the computation result of the mass flow rate computation section: and a diagnosing display screen which displays the first mass flow rate display section and the second mass flow rate display section on the same screen.

BRIEF DESCRIPTION OF THE DRAWINGS

FIG. 2 is a flowchart showing an operation of the embodiment in FIG. 1

FIG. 3 is a diagram showing a diagnosing condition input screen 50 of the embodiment in FIG. 1.

FIG. 5 is a diagram showing a diagnosing condition input screen 60 and a diagnosis result display screen 70 of the embodiment in FIG. 1.

FIG. 6 is a diagram showing a diagnosing condition input screen 60 and a diagnosis result display screen 70 of the embodiment in FIG. 1.

FIG. 10 is a diagram showing a diagnosing condition input screen 90 and a diagnosis result display screen 100 of the embodiment in FIG. 7.

FIG. 11 is a diagram showing the diagnosing condition input screen 90 of the embodiment in FIG. 7.

FIG. 12 is a diagram showing the diagnosing condition input screen 90 of the embodiment in FIG. 7.

DESCRIPTION OF THE PREFERRED EMBODIMENTS

Figure 1:
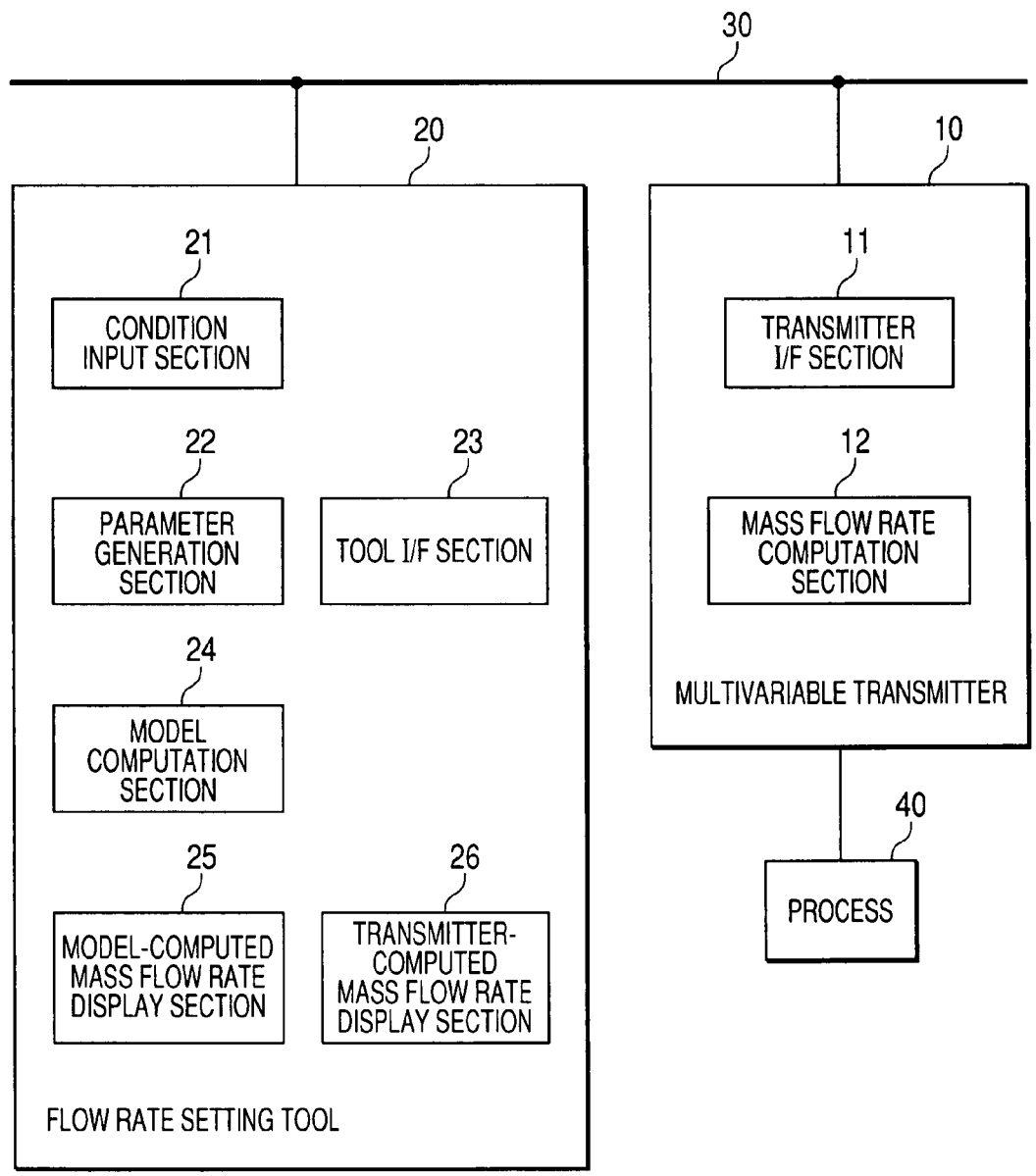
FIG. 1 is a constitutional diagram showing an embodiment of the invention.

Hereinafter, the invention will be described in detail based on FIG. 1. FIG. 1 is a constitutional diagram showing one embodiment of the invention.

A multivariable transmitter 10 and a flow rate setting tool 20 are connected respectively to a network 30.

The multivariable transmitter 10 is disposed to a pipe, etc., of a process 40, and includes a transmitter interface (I/F) section 11 and a mass flow rate computation section 12. The mass flow rate computation section 12 calculates a mass flow rate in real time by Using a simplified equation, based on a differential pressure, a static pressure, and a temperature which are detected by the process.

The transmitter interface section 11 then receives operational parameters for the equation in the mass flow rate computation section 12 from the network 30, and transmits a computation result of the mass flow rate computation section 12 to the network 30.

Further, the flow rate setting tool 20 is implemented by using software executed in a personal computer, for example. The constitution of the flow rate setting tool 20 will be described in detail below.

A condition input section 21 is provided for inputting a diagnosing condition. Specifically, a static pressure, a temperature, and other diagnosing conditions are inputted by a keyboard, etc.

A parameter generation section 22 generates operational parameters. (K1, K2, . . . ) of the mass flow rate computation based on the static pressure, the temperature, and the other diagnosing conditions. Incidentally, the parameter generation section 22 is independent from the setup of diagnosis.

A tool interface (I/F) section (interface section) 23 transmits the operational parameters (K1, K2, . . . ) to the multivariable transmitter 10 via the network 30. The tool interface section 23 also receives a computation result A of the mass flow rate computation section 12 in the multivariable transmitter 10.

Further, a model computation section 24 calculates a detailed mass flow rate value on the basis of the differential pressure, static pressure, temperature, and the other diagnosing conditions. Specifically, the model computation section 24 performs a highly accurate computation of floating-point calculation, etc., to calculate amass flow rate value B to be a reference value.

A model-computed mass flow rate display section 25 displays the output value B of the model computation section 24. A transmitter-computed mass flow rate display section 26 also displays the computation result A.

An operator then checks a difference between the value B and the computation result A to diagnose, for example. Specifically, if this difference is present in a predetermined range, the computation result A is diagnosed as "OK."

Hereinafter, an operation of the embodiment in FIG. 1 will be described in detail based on FIG. 2. FIG. 2 is a flowchart showing the operation of the embodiment in FIG. 1.

First, the parameter generation section 22 of the embodiment in FIG. 1 generates the operational parameters (K1, K2, . . . ) of the mass flow rate operation. Then, the operational parameters (K1, K2, . . . ) are downloaded to the multivariable mass flow rate transmitter. That is, the parameters are downloaded first.

Next, in the condition input section 21 of the embodiment in FIG. 1, a step S2 to select a density diagnosing mode is executed. Then, for example, single condition designation, n conditions designation or a range designation is selected.

Subsequently, in the condition input section 21, a step S3 to input the diagnosing conditions is executed. Then, for example, a static pressure value, a temperature value, a diagnosis determination threshold value, and other diagnosing conditions are inputted.

In the mass flow rate computation section 12 of the embodiment in FIG. 1, a step S4 to perform the mass flow rate computation is executed. The computation result A of the mass flow rate computation section 12 is then transferred to the flow rate setting tool 20. The model computation section 24 of the embodiment in FIG. 1 calculates the mass flow rate value B on the basis of the diagnosing conditions.

Next, a step S5 is executed to diagnose the mass flow rate computation. For details, comparison is made between the diagnosis determination threshold value and a difference between the output value B of the model computation section and the computation result A.

Finally, a step S6 is executed to display a diagnosis result. For example, the output value of the model computation section and the computation result are displayed, respectively, and the difference between the output value of the model computation section and the computation result is displayed as a percentage.

Figure 4:
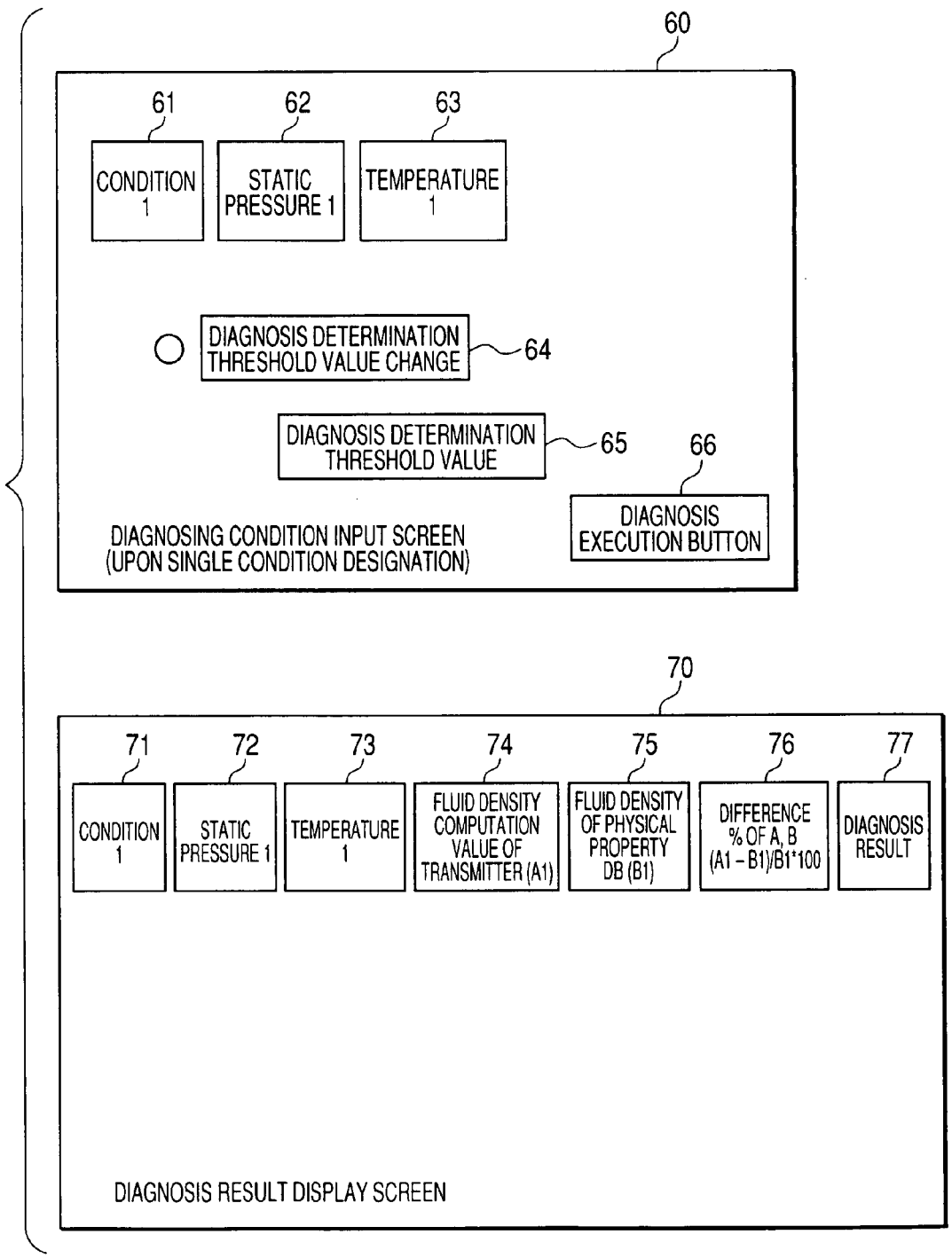
FIG. 4 is a diagram showing a diagnosing condition input screen 60 and a diagnosis result display screen 70 of the embodiment in FIG. 1.

A display screen of the embodiment in FIG. 1 described above will be described with use of FIG. 3 to FIG. 6. In FIG. 4 to FIG. 6, a diagnosis result display screen 70 displays the model-computed mass flow rate display section 25 and the transmitter-computed mass flow rate display section 26 on the same screen thereof, and also displays the value based on the difference between the output of the model computation section 24 and the computation result.

FIG. 3 is a diagram showing a diagnosing condition input screen 50 of the embodiment in FIG. 1.

The diagnosing condition input screen 50 corresponds to step S2 of the flowchart in FIG. 2. A density diagnosing mode selection 51, a single condition designation 52, a n conditions designation 53, a number of conditions designation 54, and a range designation 55.

One of checkboxes of the single condition designation 52, the n conditions designation 53, or the range designation 55 is turned on. If the n conditions designation 53 is selected, a value of the number of conditions designation 54 is inputted.

FIG. 4 is a diagram showing a diagnosing condition input screen 60 and a diagnosis result display screen 70, which corresponds to a case where the single condition designation is selected in the step S2.

The diagnosing condition input screen 60 displays a condition 61, a static pressure 62, a temperature 63, a diagnosis determination threshold value change 64, a diagnosis determination threshold value 65, and a diagnosis execution button 66. The diagnosing condition input screen 60 corresponds to the step S3 of the flow chart in FIG. 2. Input of the static pressure and temperature and change of the diagnosis determination threshold value are performed, and then the diagnosis execution button is pressed.

The diagnosis result display screen 70 displays a condition 71, a static pressure 72, a temperature 73, the computation result (a fluid density computation value of the transmitter) 74 of the mass flow rate computation section 12 of the embodiment in FIG. 1, the output value B (a fluid density of physical property DB (database)) 75 of the model computation section 24 of the embodiment in FIG. 1, a quotient 76 obtained from a difference between the computation result A and the value B divided by the value B, and a diagnosis result 77. The diagnosis result display screen 70 is obtained by executing the steps 53 to S6 of the flowchart in FIG. 2.

FIG. 5 is a diagram showing the diagnosing condition input screen 60 and the diagnosis result display screen 70 of the embodiment in FIG. 1, which corresponds to a case where the n conditions designation is selected in the step S2.

The diagnosing condition input screen 60 displays plural sets, one set of which includes the condition 61, the static pressure 62 and temperature 63, respectively, and also displays the diagnosis determination threshold value change 64, the diagnosis determination threshold value 65, and the diagnosis execution button 66. The diagnosing condition input screen 60 corresponds to the step S3 of the flowchart in FIG. 2. Input of the static pressure and temperature is respectively performed, change of the diagnosis determination threshold value is performed, and then the diagnosis execution button is pressed.

The diagnosis result display screen 70 displays plural sets, one set of which includes the condition 71, the static pressure 72, the temperature 73, the computation result A (the fluid density computation value of the transmitter) 74 of the mass flow rate computation section 12 of the embodiment in FIG. 1, the output value B (the fluid density of physical property DB) 75 of the model computation section 24 of the embodiment in FIG. 1, a quotient 76 obtained from the difference between the computation result A and the value B divided by the value B, and a diagnosis result 77. The diagnosis result display screen 70 is obtained by executing the steps S4 to S6 repeatedly for plural times, of the flowchart in FIG. 2.

FIG. 6 is a diagram showing the diagnosing condition input screen 60 and the diagnosis result display screen 70 of the embodiment in FIG. 1, which corresponds to a case where the range designation is selected in the step S2.

The diagnosing condition input screen 60 displays a range 601, a range change 602, a first static pressure 621, a first temperature 631, a second static pressure 622, a second temperature 632, a division number change 603, a static pressure division number 604, a temperature division number 605, the diagnosis determination threshold value change 64, the diagnosis determination threshold value 65, and the diagnosis execution button 66. The diagnosing condition input screen 60 corresponds to the step S2 of the flowchart in FIG. 2. Input of the static pressure and temperature is performed, change of the range and division number is performed, change of the diagnosis determination threshold value is performed, and then the diagnosis execution button is pressed.

For example, the range from the first static pressure 621 to the second static pressure 622 is then equally divided automatically on the basis of the static pressure division number 604. The range from the first temperature 631 to the second temperature 632 is also equally divided automatically on the basis of the temperature division number 605, for example.

The diagnosis result display screen 70 displays plural sets, one set of which includes the condition 71, the static pressure 72, the temperature 73, the computation result A (the fluid density computation value of the transmitter) 74 of the mass flow rate computation section 12 of the embodiment in FIG. 1, the output value B (the fluid density of physical property DB) 75 of the model computation section 24 of the embodiment in FIG. 1, a quotient 76 obtained from the difference between the computation result A and the value B divided by the value B, and a diagnosis result 77. The diagnosis result display screen 70 is obtained by executing the steps S4 to S6 repeatedly for plural times, of the flowchart in FIG. 2.

Next, referring to FIG. 7 to FIG. 11, another embodiment of the functionally expanded invention will be described.

Figure 7:
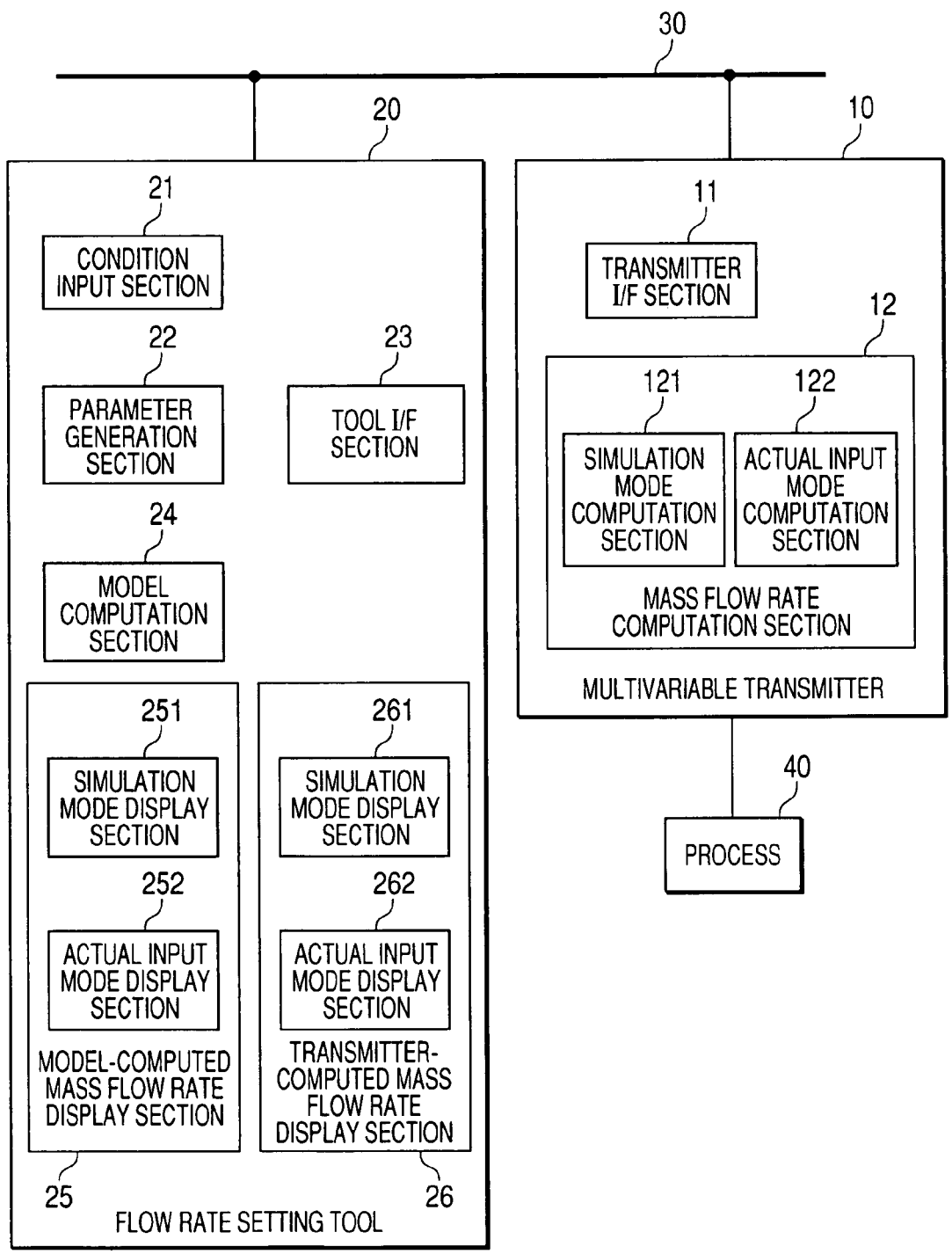
FIG. 7 is a constitutional diagram showing another embodiment of the invention.

FIG. 7 is a constitutional diagram showing another embodiment of the invention. Hereinafter, an expanded aspect from the embodiment in FIG. 1 will be described.

In the multivariable transmitter 10, the mass flow rate computation section 12 includes a simulation mode computation section 121 to which the operational parameters transmitted from the flow rate setting tool 20 are inputted, and an actual input mode computation section 122 to which actual data of the process inputted to the multivariable transmitter 10 are inputted.

In the flow rate setting tool 20, the transmitter-computed mass flow rate display section 26 includes a simulation mode display section 261 and an actual input mode display section 262 which receive a computation result of the simulation mode computation section 121 and a computation result of the actual input mode computation section 122 from the multivariable transmitter, and selectively display the computation results.

In the flow rate setting tool 20, the model-computed mass flow rate display section 25 includes a simulation mode display section 251 and an actual input mode display section 252 which selectively display the output value of the model computation section 24 in the simulation mode and the output value of the model computation section 24 in the actual input mode, respectively.

The model computation section 24 obtains the same data as the actual data of the process that are inputted to the actual input mode computation section 122 in the multivariable transmitter 10, from the multivariable transmitter 10, and performs the model computation.

Figure 8:
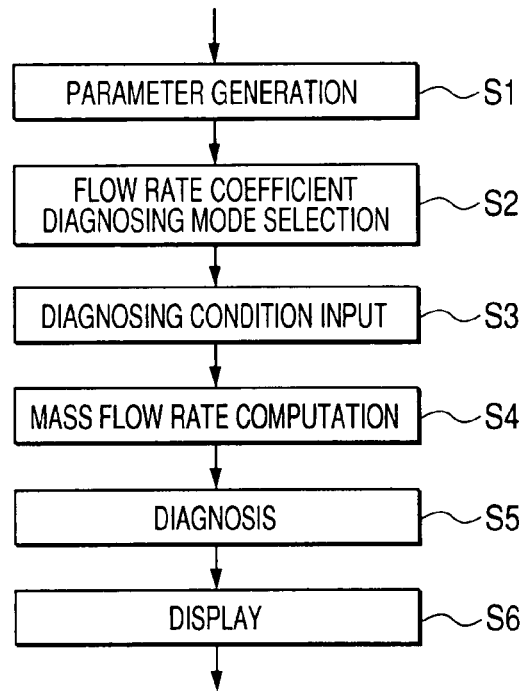
FIG. 8 is a flowchart showing an operation of the embodiment in FIG. 7.

FIG. 8 is a flowchart showing an operation of the embodiment in FIG. 7. Different point from the flowchart in FIG. 2 is a step S2 of a flow rate coefficient diagnosing mode selection, and other steps are identical to those in FIG. 2.

Figure 9:
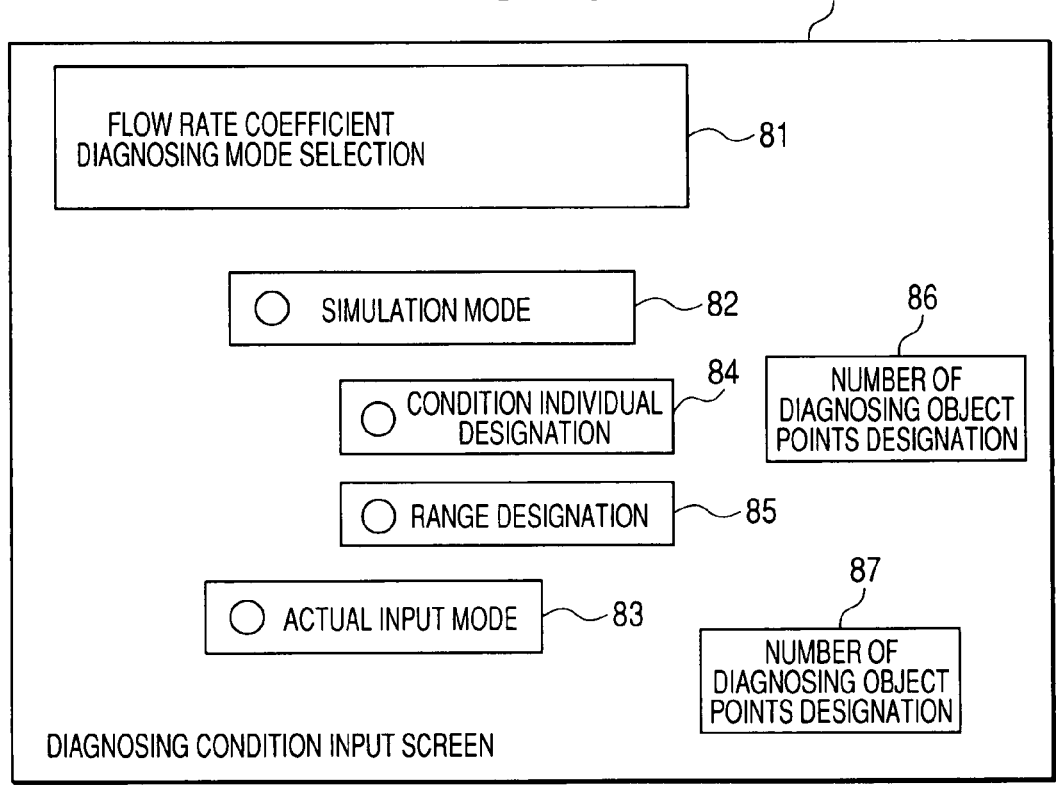
FIG. 9 is a diagram showing a diagnosing condition input screen 80 of the embodiment in FIG. 7.

FIG. 9 is a diagram showing a diagnosing condition input screen 80 of the embodiment in FIG. 7. The diagnosing mode of the embodiment is a flow rate coefficient diagnosing mode in which a mass flow rate computation result of the multivariable transmitter in the simulation mode and actual input mode is compared with a model computation result of the flow rate setting tool.

The diagnosing condition input screen 80 corresponds to the step S2 of the flowchart in FIG. 8. In the screen 80, by the flow rate coefficient diagnosing mode selection 81, the simulation mode or the actual input mode is selected, so that either a simulation mode checkbox 82 or an actual input mode checkbox 83 is turned on.

When the simulation mode is selected, either an condition individual designation checkbox 84 or a range designation checkbox 85 is turned on. Further, when the condition individual designation is selected, a value of a number of points designation is inputted by a number of diagnosing object points designation 86. When the actual input mode is selected, a value of a number of points designation is inputted by a number of diagnosing object points designation 87.

FIG. 10 is a diagram showing a diagnosing condition input screen 90 and a diagnosis result display screen 100 to input plural conditions, in the case where the simulation mode is selected in the diagnosing condition input screen 80 in FIG. 9, which corresponds to the case where the n conditions designation is selected in the simulation mode in the step S2 of the flowchart in FIG. 8.

The input screen 90 displays n conditions 91, differential pressures 92, static pressures 93 and temperatures 94 corresponding to the respective conditions, and also displays a diagnosis determination threshold value change 95, a diagnosis determination threshold value 96, and a diagnosis execution button 97. This screen corresponds to the step S3 of the flowchart in FIG. 8. Inputs of the differential pressures, static pressures and temperatures are performed, respectively. Change the diagnosis determination threshold value is performed. Then, the diagnosis execution button 97 is pressed.

The diagnosis result display screen 100 displays plural sets for n conditions, each of the sets includes a condition 101, a differential pressure 102, a static pressure 103, a temperature 104, a coefficient computation value (result A) 105 of the simulation mode computation section 121 in the multivariable transmitter 10, an output value (value B) 106 of the model computation section 24 in the simulation mode of flow rate setting tool 20, a quotient 107 obtained from a difference between the result A and the value B divided by the value B, and a diagnosis result 108. The diagnosis result display screen 100 is obtained by executing steps S4 to S6 repeatedly for n times, of the flowchart in FIG. 8.

FIG. 11 is a diagram showing the diagnosing condition input screen 90 which is displayed in a case where the range designation is selected in the diagnosing condition input screen 80 of FIG. 9, which corresponds to the case where the range designation is selected in the simulation mode in the step S2 of the flowchart in FIG. 8.

The diagnosing condition input screen 90 displays a range 901, a range change 902, a first differential pressure 921, a first static pressure 931, a first temperature 941, a second differential pressure 922, a second static pressure 932, a second temperature 942, a division number change 903, a differential pressure division number 904, a static pressure division number 905, a temperature division number 906, a diagnosis determination threshold value change 95, a diagnosis determination threshold value 96, and a diagnosis execution button 97.

This display screen 90 corresponds to the step S3 of the flowchart in FIG. 8. Inputs of the differential pressures, static pressures and temperatures are performed, respectively. Change of the range and division number is performed. Change of the diagnosis determination threshold value is performed. Then, the diagnosis execution button is pressed.

Then, the range from the first differential pressure 921 to the second differential pressure 922 is divided automatically on the basis of the differential pressure division number 904. Similarly, the range from the first static pressure 931 to the second static pressure 932 is divided automatically on the basis of the static pressure division number 905. The range from the first temperature 941 to the second temperature 942 is also divided automatically on the basis of the temperature division number 906.

A diagnosis result display screen in the simulation mode by the range selection is similar as the diagnosis result display screen 100 in the simulation mode selected by the condition individual designation in FIG. 10, therefore, description for the display screen is omitted.

FIG. 12 is a diagram showing the diagnosing condition input screen 90 displayed in a case where the actual input mode is designated in the diagnosing condition input screen 80 of FIG. 9, which corresponds to the case where the actual input mode is selected in the step S2 of the flowchart in FIG. 8.

The diagnosing condition input screen 90 displays the diagnosis determination threshold value change 95, the diagnosis determination threshold value 96 and the diagnosis execution button 97. This screen corresponds to the step S3 of the flowchart in FIG. 8. Change of the diagnosis determination threshold value is then performed, and the diagnosis execution button is pressed.

This diagnosis result display screen in the actual input mode is similar as the diagnosis result display screen 100 in the simulation mode, therefore, description for the display screen is omitted. However, the computation result A of the flow rate coefficient of the transmitter and the output value B of the model computation section are computation values in the actual input mode.

In the aforementioned embodiments of FIG. 1 to FIG. 7, the density computation value of the transmitter, the fluid density of the physical property database and the flow rate coefficient computation value can be compared easily together with error rates, on the same screen. Further, the diagnosis results are also displayed automatically in accordance with the diagnosing threshold value being set in advance. The diagnosis can be performed automatically by the temperature, pressure range and division number. The diagnosis can also be performed in more detailed conditions only by changing the division number. The diagnosis can be performed by inputting arbitrary static pressure conditions and arbitrary temperature conditions.

Therefore, according to the embodiments in FIG. 1 and FIG. 7, it is easily diagnosed whether the computation of the mass flow rate by the multivariable mass flow rate transmitter 10 is normal, so that efficiency for troubleshooting in an abnormal situation is enhanced.

In the aforementioned embodiments, the model computation section 24 is incorporated in the flow rate setting too 20. Apart from the constitution, a constitutional element corresponding to the model computation section may be incorporated in the multivariable transmitter 10. In this case, the constitution is the same as that of the aforementioned embodiments, and its operation and effects are also the same as those of the embodiments.

According to the present invention, the following effects are obtained.

(1) A multivariable mass flow rate transmitter system adapted to set optimal operational parameters easily in a short time can be provided. According to the invention, a computation result of the mass flow rate can be diagnosed easily.

(2) According to the invention, diagnosing reliability is enhanced by performing diagnosis in the actual input mode.

Further, the invention is not restricted by the aforementioned embodiments, and various changes and modifications may be made in the invention without departing from the spirit of the invention.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A multivariable mass flow rate transmitter system, comprising:
   a multivariable mass flow rate transmitter which has a mass flow rate computation section and is connected to a network; and
   a flow rate setting tool which performs a setup of the mass flow rate computation section in the multivariable mass flow rate transmitter via the network,
   wherein the flow rate setting tool includes:
   a parameter generation section which generates operational parameters of the mass flow rate computation section;
   a condition input section for inputting a diagnosing condition;
   an interface section which transmits the operational parameters to the multivariable mass flow rate transmitter via the network, and receives a computation result of the mass flow rate computation section;
   a model computation section which calculates a mass flow rate value based on the diagnosing condition;
   a first mass flow rate display section which displays an output value of the model computation section;
   a second mass flow rate display section which displays the computation result of the mass flow rate computation section; and
   a diagnosing display screen which displays the first mass flow rate display section and the second mass flow rate display section on the same screen.

2. The multivariable mass flow rate transmitter system according to claim 1, wherein the model computation section calculates the mass flow rate value based on each of a plurality of diagnosing conditions that are generated automatically in predetermined numbers from the diagnosing condition inputted in the condition input section.

3. The multivariable mass flow rate transmitter system according to claim 1, wherein the diagnosing display screen displays a value based on a difference between the output value of the model computation section and the computation result of the mass flow rate computation section.

4. The multivariable mass flow rate transmitter system according to claim 1, wherein the mass flow rate computation section in the multivariable mass flow rate transmitter comprises:
   a simulation mode computation section which employs the operational parameters transmitted from the flow rate setting tool; and
   an actual input mode computation section which employs actual data of process that are inputted in the multivariable mass flow rate transmitter.

5. The multivariable mass flow rate transmitter system according to claim 4, wherein the second mass flow rate display section includes a simulation mode display section and an actual input mode display section which display at least one of a computation result of the simulation mode computation section and a computation result of the actual input mode computation section, being received from the multivariable mass flow rate transmitter.

6. The multivariable mass flow rate transmitter system according to claim 4, wherein the first mass flow rate display section includes a simulation mode display section and an actual input mode display section which display at least one of the output value of the model computation section in the simulation mode and the output value of the model computation section in the actual input mode.

7. The multivariable mass flow rate transmitter system according to claim 6, wherein the model computation section executes a model computation in the actual input mode by obtaining the actual data of the process from the multivariable mass flow rate transmitter.

8. A flow rate setting tool for performing a setup of a mass flow rate computation section in a multivariable mass flow rate transmitter via a network, the flow rate setting tool comprising:
   a parameter generation section which generates operational parameters of the mass flow rate computation section;
   a condition input section for inputting a diagnosing condition;

an interface section which transmits the operational parameters to the multivariable mass flow rate transmitter via the network, and receives a computation result of the mass flow rate computation section;

a model computation section which calculates a mass flow rate value based on the diagnosing condition;

a first mass flow rate display section which displays an output value of the model computation section;

a second mass flow rate display section which displays the computation result of the mass flow rate computation section; and a diagnosing display screen which displays the first mass flow rate display section and the second mass flow rate display section on the same screen.

9. The flow rate setting tool according to claim 8, wherein the model computation section calculates the mass flow rate value based on each of a plurality of diagnosing conditions that are generated automatically in predetermined numbers from the diagnosing condition inputted in the condition input section.

10. The flow rate setting tool according to claim 8, wherein the diagnosing display screen displays a value based on a difference between the output value of the model computation section and the computation result of the mass flow rate computation section.

11. The flow rate setting tool according to claim 8, wherein the mass flow rate computation section in the multivariable mass flow rate transmitter comprises:

a simulation mode computation section which employs the operational parameters transmitted from the flow rate setting tool; and an actual input mode computation section which employs actual data of process that are inputted in the multivariable mass flow rate transmitter, and the second mass flow rate display section includes a simulation mode display section and an actual input mode display section which display at least one of a computation result of the simulation mode computation section and a computation result of the actual input mode computation section, being received from the multivariable mass flow rate transmitter.

12. The flow rate setting tool according to claim 8, wherein the mass flow rate computation section in the multivariable mass flow rate transmitter comprises:

a simulation mode computation section which employs the operational parameters transmitted from the flow rate setting tool; and an actual input mode computation section which employs actual data of process that are inputted in the multivariable mass flow rate transmitter, and the first mass flow rate display section includes a simulation mode display section and an actual input mode display section which display at least one of the output value of the model computation section in the simulation mode and the output value of the model computation section in the actual input mode.

13. The flow rate setting tool according to claim 12, wherein the model computation section executes a model computation in the actual input mode by obtaining the actual data of the process from the multivariable mass flow rate transmitter.

* * * * *